UNITED STATES PATENT OFFICE.

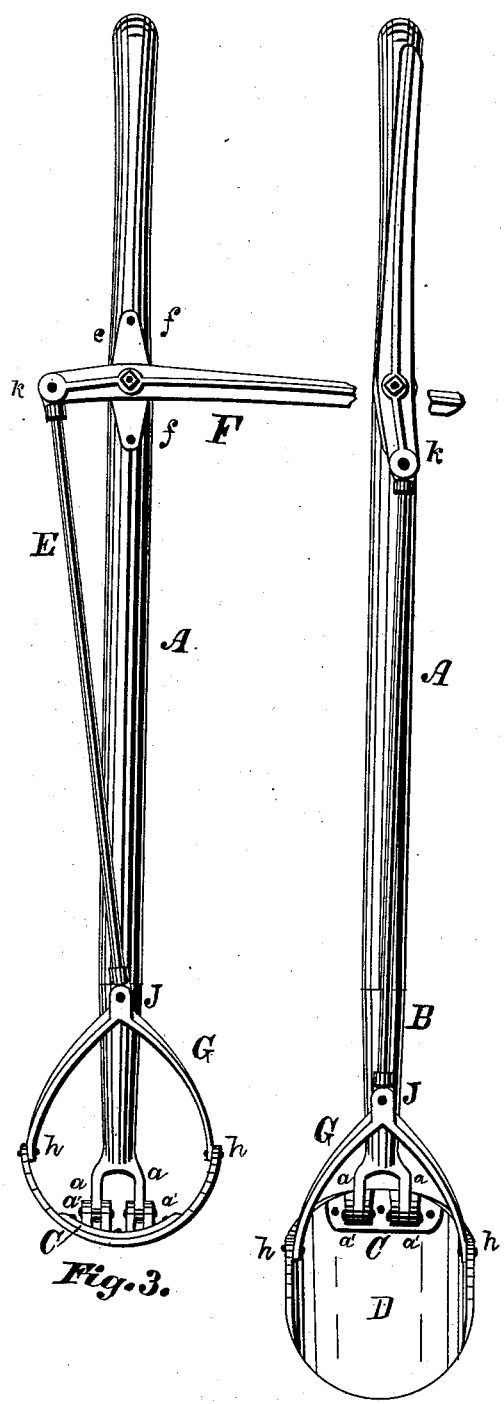
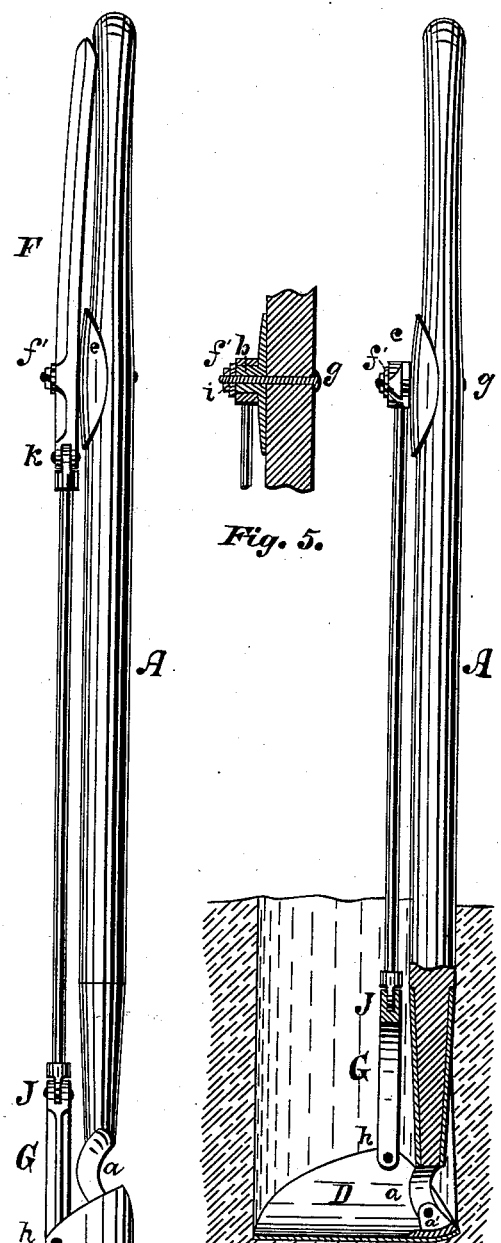
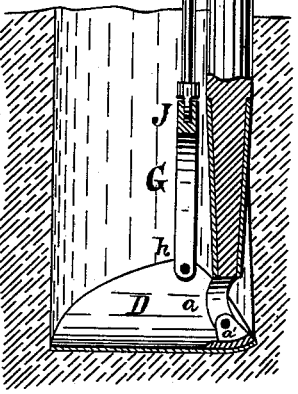

WILLIAM GIBBS AND ELMER W. GIBBS, OF CANTON, OHIO.

POST-HOLE DIGGER.

SPECIFICATION forming part of Letters Patent No. 334,653, dated January 19, 1886.

Application filed September 4, 1885. Serial No. 176,185. (No model.)

*To all whom it may concern:*

Be it known that we, WILLIAM GIBBS and ELMER W. GIBBS, citizens of Canton, county of Stark, State of Ohio, have invented a new and useful Improvement in Post-Hole Diggers, of which the following is a full, clear, and exact description, reference being had to the accompanying drawings, making part of this specification.

Our invention relates to improvements in post-hole diggers.

The object is to provide a post-hole digger consisting of a single swinging shovel and the means of operating it, as will be hereinafter explained, and set forth in the specification and claims.

Figure 1 is a front, and Fig. 2 a side, elevation of our improved post-hole digger, showing the shovel in position to penetrate the ground. Fig. 3 is a front elevation, and shows the shovel turned on a line forming a right angle to a line drawn vertically through the handle. Fig. 4 is a sectional side view of shovel and handle on the same angle with the shovel on the bottom of a hole. Fig. 5 is a view of the axle, about which the hand-lever rotates.

Letter A represents the handle, which is situated centrally over the shovel, which is concavo-convex in form, and terminates in a conical annular socket or ferrule, B, which has a hinged connection with plate C, attached to the upper inside edge of the shovel D. The plate C is provided with lugs or ears, which are perforated, and to which the socket B has a hinged connection by means of the shank or shanks $a$ $a$, as socket B may terminate in one shank, or it may be bifurcated, as shown, and the shanks passed between the ears $a'$ on the plate C, a pin or pins passed through in some well-known and approved manner, thus forming a strong and durable hinge-connection with the shovel. The bail G has a pivotal connection, $h$ $h$, with the side edge of the shovel, and is connected by a rod, E, to a hand-lever, F, which rests upon and vibrates about an axle, $b$, projected from plate $c$, which is attached to the handle A by the bolts $f f$. Lever F having been placed on the axle $b$, washer $f'$ is placed against the axle and bolt $g$ passed through the handle A, and axle $b$ and nut $i$ turned on, which will secure the parts in their working position. The rod E has a pivotal connection with the lugs J of the bail G, and also a pivotal connection, K, with the hand-lever F, which is slightly curved and concaved at its free end, so as to conform to the convex surface of the handle A, and so secured to the axle $b$ as to rest against the handle A when in line with it, so that the operator may clasp with his hand both the handle A and the lever F, thus locking the lever F and the rod E parallel with the handle A, and the shovel in position to penetrate the ground.

In this construction of post-hole digger, we do not use any form of spring or locking mechanism to engage the parts in working position, the handle A being used to drive the shovel into the ground and to draw it out of the hole with its load, while the lever F is used to change and control the position of the shovel, and to sustain it in a position at right angles with the handle A. The reciprocating rod E may be bifurcated at one of its ends, forming the bail integral with the rod, the prongs adapted for a pivotal engagement with the sides of the shovel, the other end to engage with the hand-lever.

We deem the simplicity of construction is such as to require no further explanation.

The operation is as follows: The parts are placed in position, as shown in Fig. 2. The handle is grasped by the operator, one hand embracing the handle A and lever F near the top, holding the lever F and connecting-rod E parallel with handle A. The other hand may embrace the handle at any convenient point below the lever. The upper hand pressing the lever against the handle will hold the parts rigidly in position. By striking the shovel into the ground, describing a circle, the diameter of which should be a little greater than the length of the shovel, the digger may be used as an ordinary shovel to remove the earth from the upper end of the hole to a depth the length of the shovel, if desired. After the shovel has been further driven into the ground and a core of earth has been worked loose, by pressing downwardly on the handle A and turning lever F to one side, as shown in Fig. 3, B resting against the wall of the hole, the shovel will be forced across the bottom of the hole, as shown in Fig. 4, having the loose earth above it, which may now be raised from the hole, and by pressing down on the handle and vibrating the lever F the shovel may be forced under stone or other large and hard substances that may be encountered in the operation of digging post-holes.

We are aware that spades or blades have been hinged to the lower end of a hollow or grooved handle having devices for swinging and locking them, and are also aware of the fact that a post-hole digger has been known to have two vertically-arranged shovels—one rigidly attached to the handle, the other hinged to a projecting arm and swung or held in a vertical position by a short bell-crank lever extending from the hinge inwardly to a point about midway between the two shovels, an upwardly-projecting rod connecting the bell-crank lever to a hand-lever near the upper end of the handle, by which means the point of the hinged shovel may be swung toward an opposing rigid shovel.

We do not claim such devices; neither do we broadly claim hinging a digging-shovel to a handle; but in the construction referred to and heretofore used it has been necessary to use a hollow or grooved handle and locking devices and rigid digging-shovels to resist the swinging or hinged shovel.

We avoid the use of a large amount of heavy and expensive material and produce an implement more simple in construction, much more effective, and greatly reduce the initial cost.

We are aware that it is not new to pivotally secure a shovel or scoop to the lower end of a handle and connect the scoop to an operating-lever pivoted to the handle by a rod, the latter being bifurcated at its lower end for its attachment to the opposite side edges of the scoop; and hence we make no claim, broadly, to such construction.

Having thus fully described the nature and object of our invention, what we claim, and desire to secure by Letters Patent, is—

1. In a post-hole digger, the combination, with a handle, a shovel pivoted to the lower end thereof, a bail pivoted to the opposite side edges of the shovel in front of the handle, and a rod pivotally connected with the bail, of a lever pivoted to the handle in the position shown and connected with the rod, and adapted to be turned so as to rest alongside of said handle, substantially as set forth.

2. In a post-hole digger, the combination, with the handle, the ferrule B, having the bifurcated shank, and the shovel pivotally secured to said shank, of the bail pivoted to the opposite side edges of the shovel, the lever pivoted to the handle in the position shown, and the rod pivotally connected to the bail and lever, all of the above parts combined substantially as set forth.

In testimony whereof we have hereunto set our hands this 28th day of August, A. D. 1885.

WILLIAM GIBBS.
ELMER W. GIBBS.

Witnesses:
CHAS. R. MILLER,
W. K. MILLER.